United States Patent [19]

Ishimaru

[11] Patent Number: 5,544,547
[45] Date of Patent: Aug. 13, 1996

[54] TRANSMISSION FOR A WORKING VEHICLE

[75] Inventor: Yoshitaka Ishimaru, Amagasaki, Japan

[73] Assignee: Kanzaki Kokyukoki Mfg. Co., Ltd., Amagasaki, Japan

[21] Appl. No.: 257,163

[22] Filed: Jun. 9, 1994

[30] Foreign Application Priority Data

Oct. 22, 1993 [JP] Japan .................................. 5-264972

[51] Int. Cl.$^6$ .................................................. F16H 47/00
[52] U.S. Cl. ........................ 74/730.1; 74/606 R; 74/15.82
[58] Field of Search ............................. 74/730.1, 606 R, 74/15.66, 15.82, 15.4, 15.66, 718, 720; 475/200, 202

[56] References Cited

U.S. PATENT DOCUMENTS

| | | | |
|---|---|---|---|
| 4,304,141 | 12/1981 | Tone et al. ........................ | 74/606 R X |
| 4,373,597 | 2/1983 | Itatani et al. . | |
| 4,579,183 | 4/1986 | Irikura et al. ........................ | 74/15.6 X |
| 4,631,980 | 12/1986 | Ishimori .............................. | 74/718 X |
| 4,813,306 | 3/1989 | Kita et al. ............................ | 74/720 X |
| 4,856,355 | 8/1989 | Ishimaru ............................. | 74/15.4 X |
| 4,880,070 | 11/1989 | Irikura . | |
| 5,040,649 | 8/1991 | Okada ................................ | 74/483 R X |
| 5,046,994 | 9/1991 | Hasegawa et al. .................. | 475/200 X |
| 5,193,416 | 3/1993 | Kanayama ......................... | 74/730.1 X |

*Primary Examiner*—Charles A. Marmor
*Assistant Examiner*—Peter Kwon
*Attorney, Agent, or Firm*—Sterne, Kessler, Goldstein & Fox, P.L.L.C.

[57] ABSTRACT

A transmission for a working vehicle has a power takeout transmission mechanism for connecting an input shaft of a hydraulic stepless speed change device with a power takeout shaft. The power takeout transmission mechanism includes a clutch and a speed change device. A driving transmission mechanism is connected to an output shaft of the hydraulic stepless speed change device and is for driving wheels of the working vehicle. The driving transmission mechanism includes a speed change device and differential gear. The input shaft and output shaft of the hydraulic stepless speed change device are vertically juxtaposed in the front of the transmission. The clutch of the power takeout transmission mechanism and the speed change device of the driving transmission mechanism are vertically juxtaposed in a center of the housing. The speed change device of the power takeout transmission mechanism and the differential gear of the driving transmission mechanism are vertically juxtaposed in a rear of the housing. The clutch is capable of changing the speed change device of the power takeout transmission mechanism without intermittent driving of the vehicle. Accordingly, the clutch and the speed change device of the power takeout transmission mechanism, and the speed change device and differential gear of the driving transmission mechanism are disposed such that a compact transmission applicable to a small-sized vehicle can be provided with low manufacturing costs.

38 Claims, 13 Drawing Sheets

5,544,547

TRANSMISSION FOR A WORKING VEHICLE

BACKGROUND OF THE INVENTION

1. Field of the Invention

The present invention relates to a transmission for a working vehicle, such as a tractor, provided with a hydraulic stepless speed change device.

2. Description of Related Art

U.S. Pat. No. 4,373,597 discloses a hydraulic stepless speed change device that is commercially available, but expensive. The hydraulic stepless speed change device is attached to the front of a housing of a transmission, thereby extending the entire length of a body of the housing. A speed change device and a differential gear provided on a transmission route of a driving transmission mechanism are disposed longitudinally in a housing. A speed change device of a power takeout transmission mechanism is disposed between the speed change device and the differential gear of the driving transmission mechanism. Accordingly, the entire transmission is increased in longitudinal length. In addition, to switch the speed change device of the power takeout transmission mechanism it is necessary to provide a clutch between a crank shaft of an engine and an input shaft of the hydraulic stepless speed change device. When the clutch is disconnected during the speed change by the speed change device of the power takeout transmission mechanism, the hydraulic stepless speed change device also is cut off from driving, causing the vehicle to stop.

SUMMARY OF THE INVENTION

An object of the invention is to include a hydraulic stepless speed change device in a housing of the transmission. The housing contains a driving transmission mechanism and a power takeout transmission mechanism. The power takeout transmission is provided between an input shaft of the hydraulic stepless speed change device and a power takeout shaft. The power takeout transmission includes a speed change device and a clutch. The clutch is capable of changing the speed change device of the power takeout transmission mechanism without stopping the vehicle. The driving transmission mechanism is connected to an output shaft of the hydraulic stepless speed change device and is for driving wheels of the working vehicle. The driving transmission mechanism includes a speed change device and a differential gear. The hydraulic stepless speed change device, the power takeout transmission mechanism and the driving transmission mechanism are compactly disposed in the housing such that the compact transmission can be used in a small-sized vehicle and can be produced with low manufacturing costs.

The above and further objects and novel features of the invention will become more fully apparent from the following detailed description when the same is read in connection with the accompanying drawings.

BRIEF DESCRIPTION OF THE DRAWINGS

Preferred embodiments of the invention will be described in detail with reference to the following drawings in which like reference numerals refer to like elements, and wherein.

DETAILED DESCRIPTION OF PREFERRED EMBODIMENTS

Figure 1:
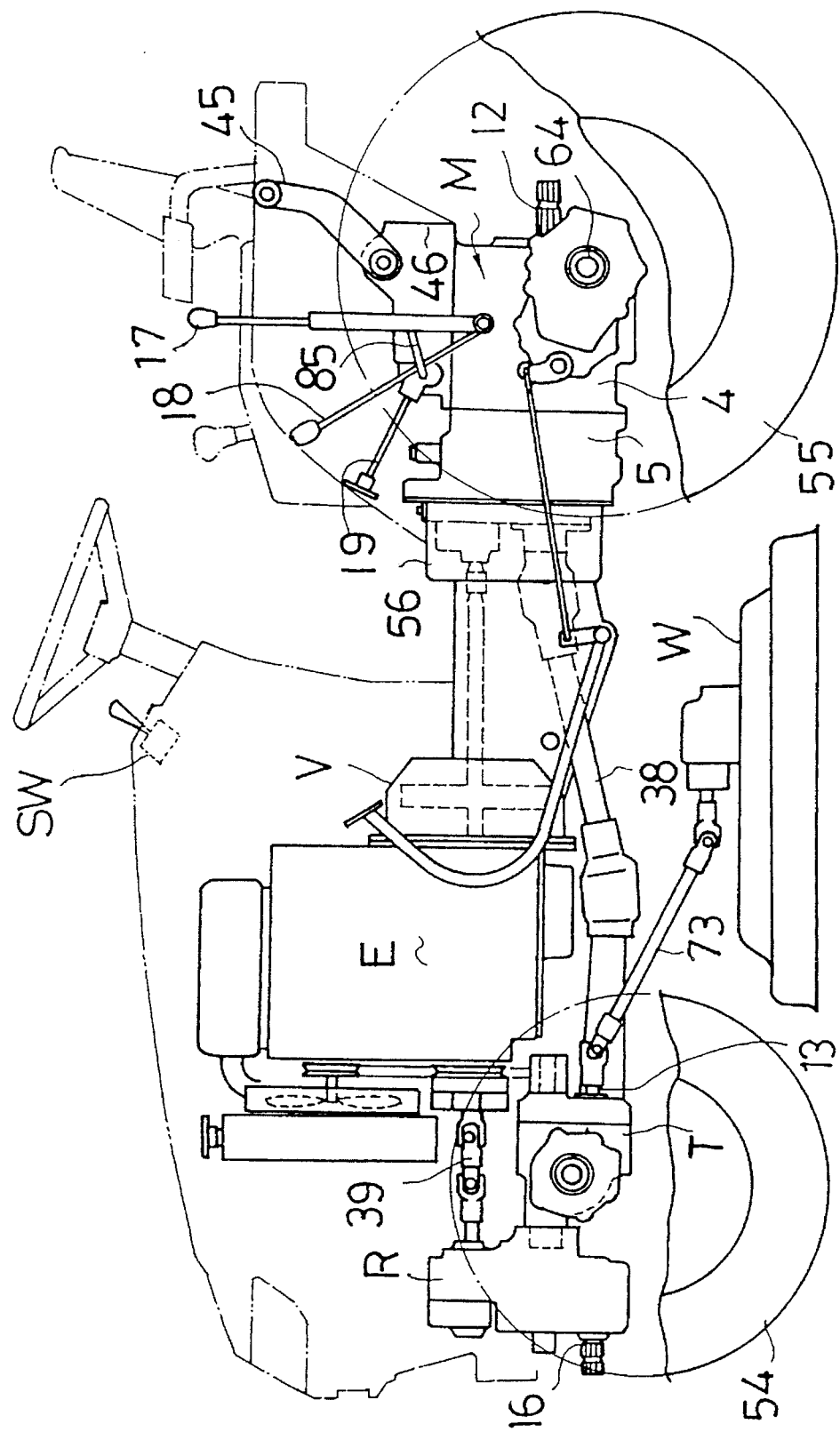
FIG. 1 is a general side view of a tractor to which a transmission of the present invention is attached.

In FIG. 1, a tractor shown as an example of a working vehicle has front wheels serving as steering wheels 54 and rear wheels 55. A body of the working vehicle comprises an engine E, a damper housing V, a body frame 56 and a housing M. Included in the housing M is a transmission in accordance with the present invention. The housing M and transmission are longitudinally disposed and coupled with each other. The housing M is formed by coupling a front portion 5 of the housing M with a rear portion 4 of the housing. The front portion 5 and rear portion 4 are capable of being separated from each other along a longitudinal axis of the vehicle. Power from the engine E is transmitted to a rear power; takeout (PTO) shaft 12 and rear axles 64 through the transmission contained in the housing M. Power is transmitted from a crank shaft of the engine E to a front PTO casing R through a universal joint 39 so as to drive a mid PTO shaft 13 projecting rearwardly of a front axle casing T of a front wheel driving unit. The front PTO casing R also includes a front PTO shaft 16 separated from the mid PTO shaft 13. The mid PTO shaft 13 drives a working machine W, such as a mower, through a universal joint 73.

The power of the transmission is transmitted into the front axle casing T through a universal joint 38 to enable the front wheels 54 to be driven. A speed change lever 17 is provided for controlling a speed change device Y, for example, by changing gears, in a driving transmission mechanism, discussed below. A front wheel drive switching lever 18, provided at a lateral side of a seat is for connecting or disconnecting power transmission to the front wheels 54. A switch SW enables the rotation of the rear PTO shaft 12 to be selectively stopped. A lift arm 45 provided at a hydraulic lift device 46 is for vertically movably connecting a working machine, such as a cultivator. A stop lever 19 is for hydraulically locking the lowering of the lift arm 45.

Figure 2:
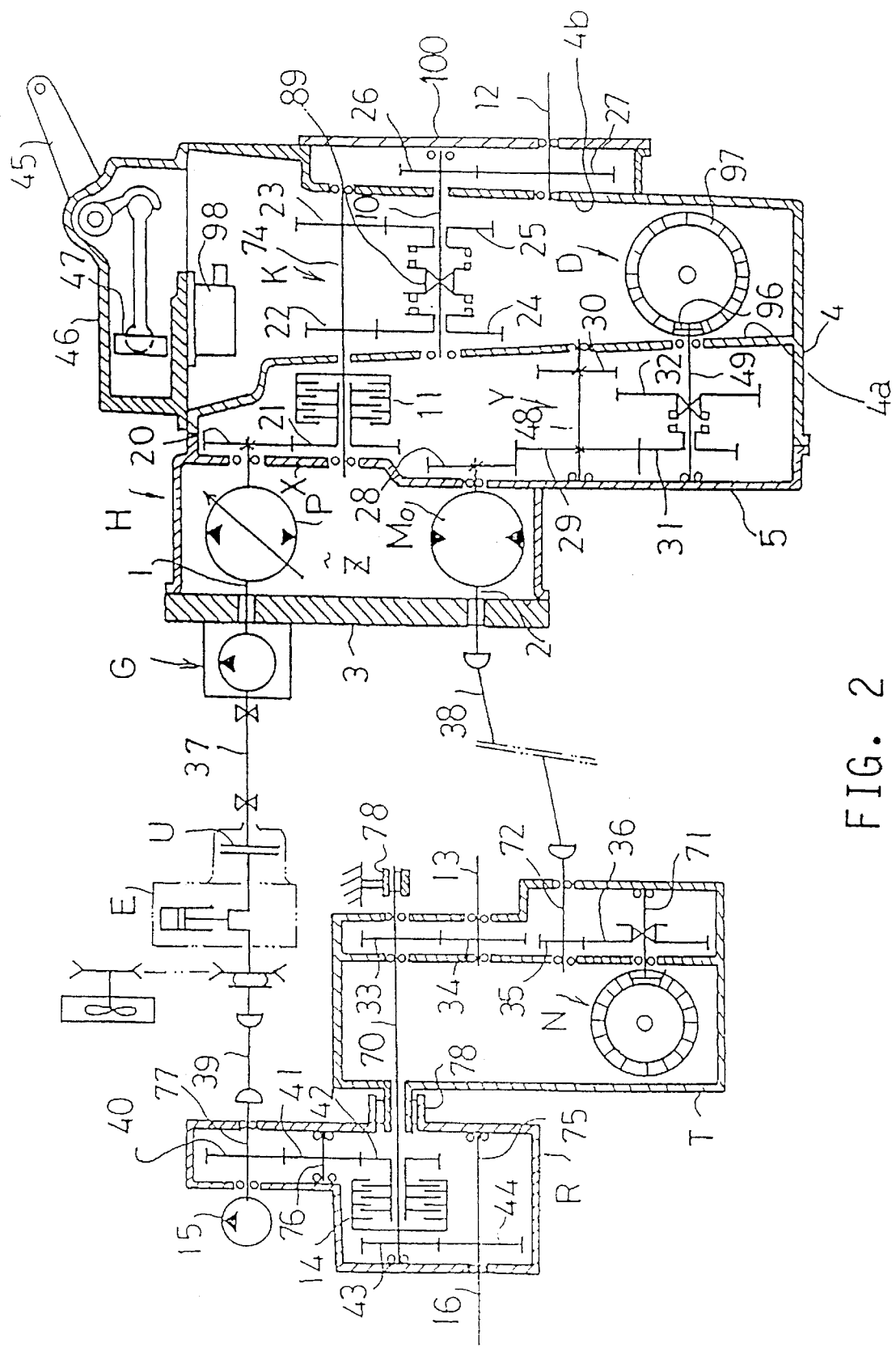
FIG. 2 is a skeleton diagram of the transmission of the present invention.
Figure 3:
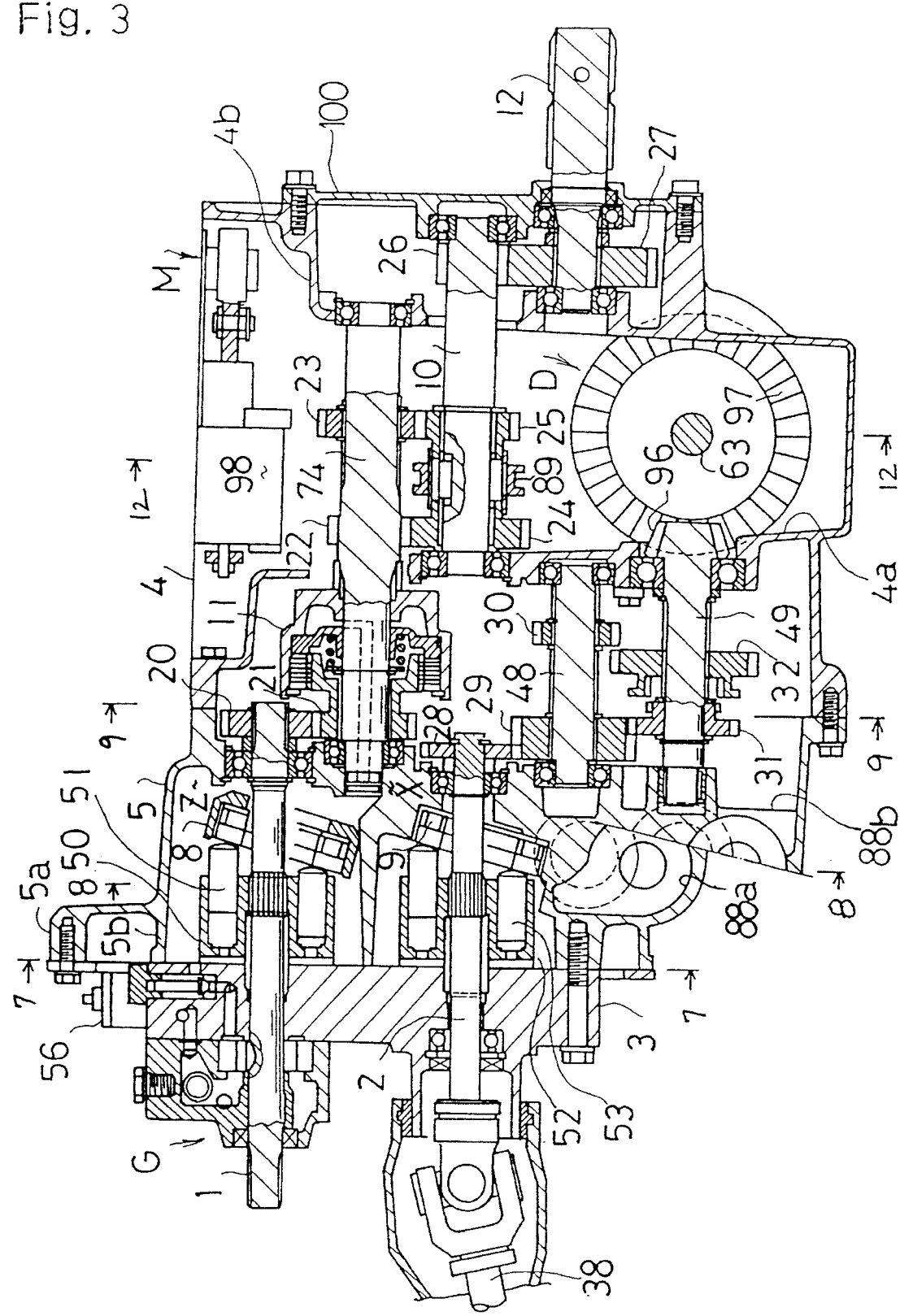
FIG. 3 is a sectional side view showing the interior of a housing.

FIGS. 2 and 3 show a damper U disposed in the damper housing V connected to a rear of the engine E. The damper U connects a crank shaft of the engine E and a driving shaft 37 in a buffering manner. The driving shaft 37 drives an input shaft 1. A charge pump G is provided at a front end of the input shaft 1 and in driven by input shift 1. A hydraulic pump P is coupled with the input shaft 1, and a hydraulic motor $M_o$ is fluidly connected therewith. The hydraulic pump P and hydraulic motor $M_o$ are disposed, preferably vertically disposed at the front portion in the housing M. As a result, the input shaft 1 and an output shaft 2, which is coupled with the hydraulic motor $M_o$, are disposed in parallel to each other. The hydraulic pump P is provided with a movable swash plate 8 to be of a variable displacement type, so that a discharge direction and a discharge amount of pressurized oil are adjustable. A center section 3 is provided with a closed circuit for fluidly coupling the hydraulic pump P with the hydraulic motor $M_o$. The center section 3 is fixed to a front end of the housing M, preferably. The hydraulic pump P, hydraulic motor $M_o$ and center section 3 are combined to form a hydraulic stepless speed change device H.

A rear end of the input shaft 1 extends toward a center of the housing M. Between the rear end of the input shaft 1 and the rear PTO shaft 12 is a power takeout transmission mechanism provided with clutch means 11, for example, a hydraulic multi-disc clutch, and a speed change device K. In detail, a gear 20 is fixed to the rear end of the input shaft 1. The gear 20 engages with a free fitting gear 21 on a first transmission shaft 74 disposed apart from, for example, under the gear 20. Clutch means 11 for intermittently enabling the free fitting gear 21 to engage with the first transmission shaft 74 is disposed on the first transmission shaft 74. The speed change device K is formed behind a clutch means 11, in other words, gears 22 and 23 are fixed on the first transmission shaft 74 and permanently engage with speed change gears 24 and 25 on a second transmission shaft 10. The second transmission shaft 10 is positioned below the first transmission shaft 74, respectively. The speed change gears 24 and 25 are freely fitted on the second transmission shaft 10. A speed change sliding member 89 integrally rotatable with the second transmission shaft 10 engages with the speed change gear 24 or the speed change gear 25, thereby obtaining two step speed change rotation at the second transmission shaft 10.

Figure 4:
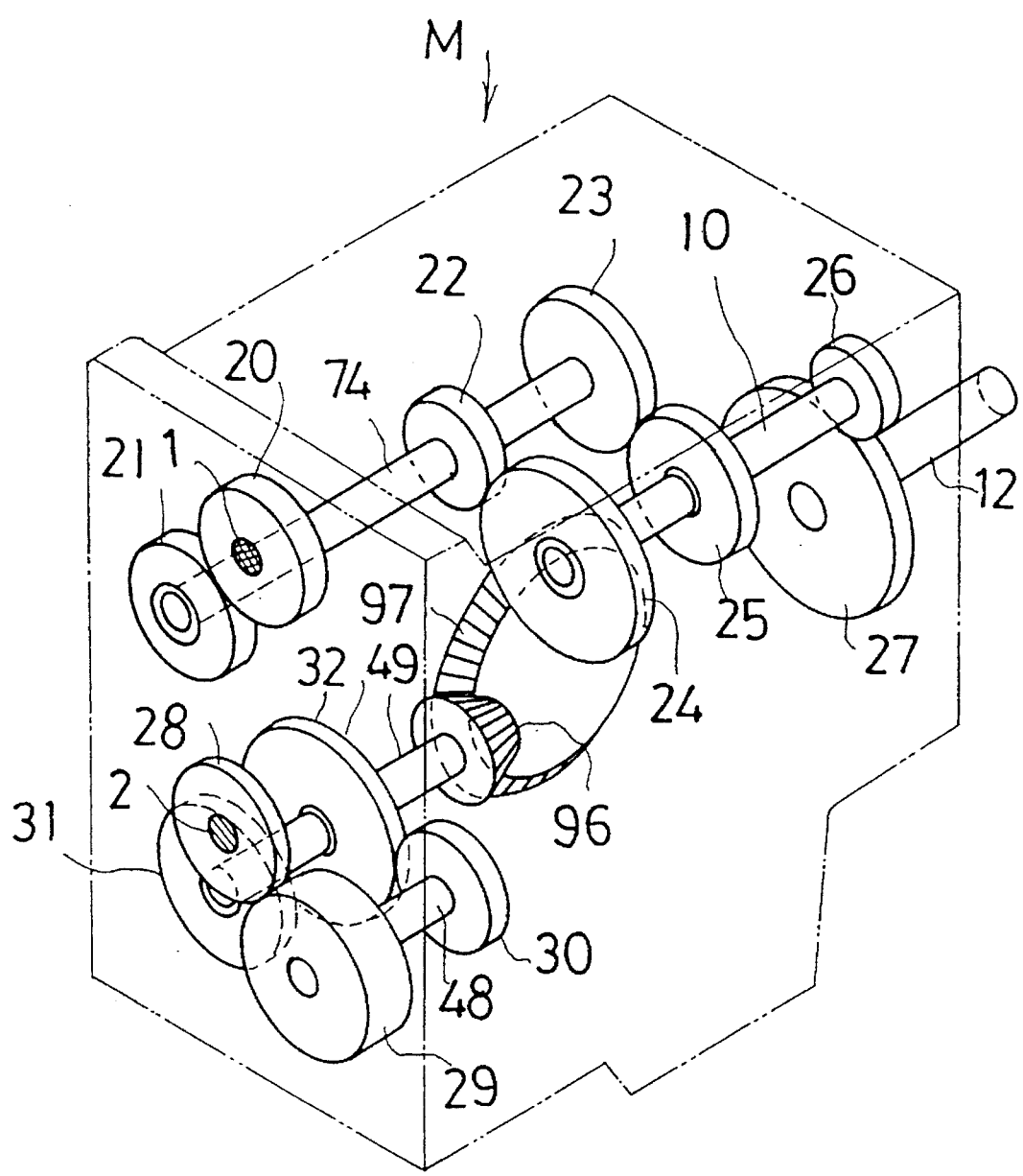
FIG. 4 is a perspective view showing arrangement of shafts and gears in the housing.

A gear 26 is fixed to a rear end of the second transmission shaft 10 and engages with a gear 27 on the rear PTO shaft 12. Thus, the clutch means 11 of the power takeout transmission mechanism is disposed on the first transmission shaft 74, which is offset with respect to the input shaft 1 and extending in parallel to the input shaft 1 so that the free fitting gear 21 driven by the input shaft 1 is selectively engageable with the first transmission shaft 74. The speed change device K extends parallel to and between the first transmission shaft 74 and the second transmission shaft 10. The speed change device K can switch in two steps the rotation speed of the PTO shaft 12 by discontinuing the clutch means 11 without stopping the working vehicle even when it is moving. Thus, the clutch means 11 and speed change device K are disposed serially, for example, from a center position toward a rear position in the upper portion of the housing M. In addition, as shown in FIG. 4, the input shaft 1 and first transmission shaft 74 are offset, for example, vertically and laterally shifted when viewed from the front. Accordingly, since the clutch means 11 and speed change device K are disposed in the rear portion 4 of the housing, a height of housing M can be reduced because it is not necessary to vertically extend the housing M to house these members.

Figure 12:
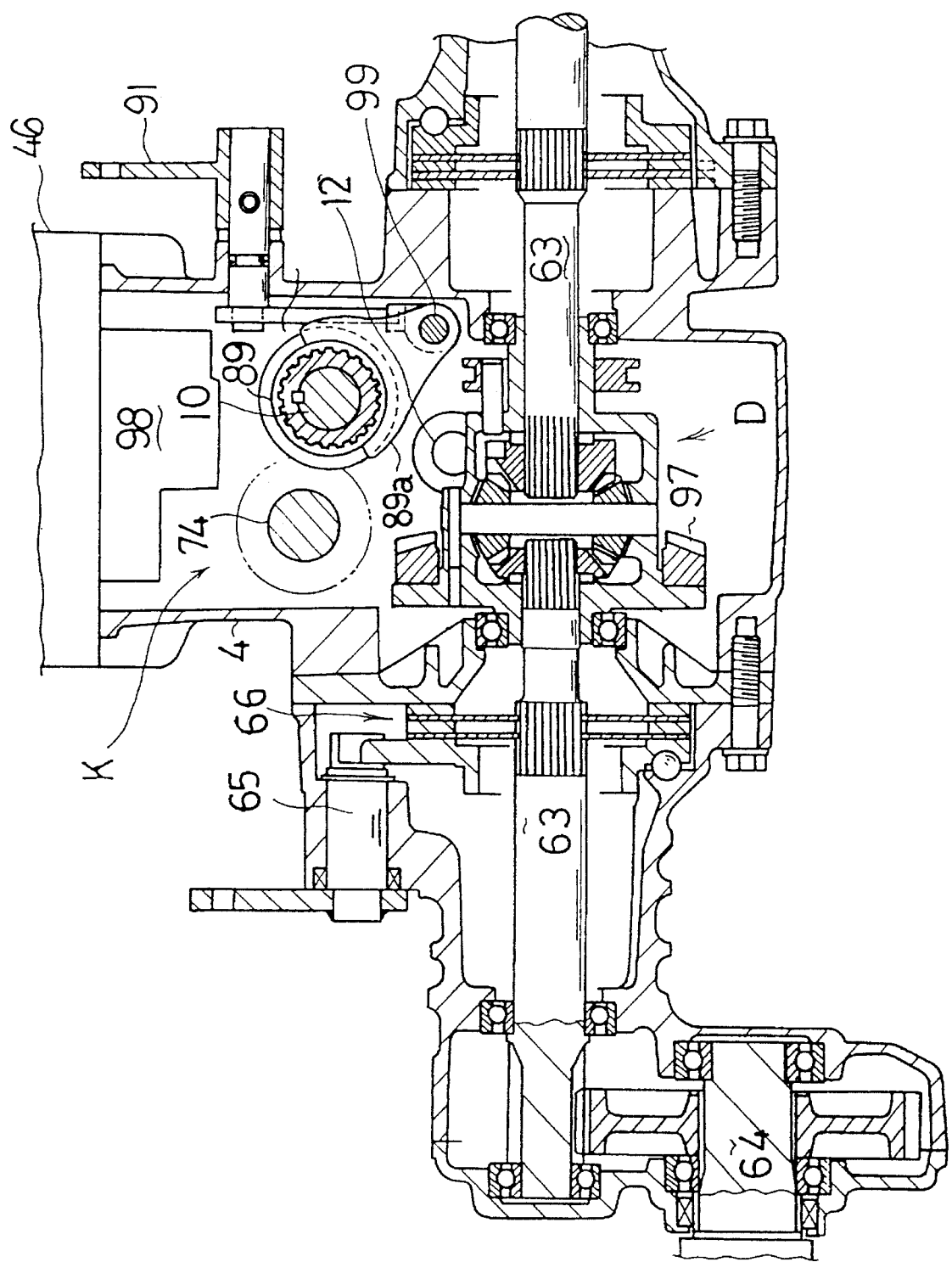
FIG. 12 is a sectional view looking in the direction of 12—12 in FIG. 3.

The output shaft 2 coupled with the hydraulic motor $M_o$ is positioned below the input shaft 1 and extends toward the center of the housing M. Between the rear end of the output Shaft 2 and the rear axles 64 is the driving transmission mechanism including the speed change device Y and the differential gear D. In detail, a gear 28 is fixed to the rear end of the output shaft 2 and permanently engages with a fixed gear 29. Fixed gear 29 has a greater thickness and is disposed on a first transmission shaft 48. Another fixed gear 30 is provided on the first transmission shaft 48. The fixed gear 29 permanently engages with a free fitting gear 31 on a second transmission shaft 49. The fixed gear 30 is engageable with a speed change gear 32 slidably mounted on the second transmission shaft 49. Thus, the speed change device Y is capable of two step speed change. In particular, when the speed change gear 32 axially slides to engage with the fixed gear 30, the rotation speed is low. When the speed change gear 32 engages with the free fitting gear 31, the rotation speed increases. Such speed change is controlled by the speed change lever 17. At the rear end of the second transmission shaft 49 is a pinion 96 engageable with a ring gear 97 on the differential gear D. The differential gear D, as seen in FIG. 12, differentially couples left and right differential yoke shafts 63 with each other. The rear axles 64 are coupled with the differential yoke shafts 63 in a driving manner, respectively. Thus, the rear axles 64 are differentially coupled with each other.

As discussed above, the speed change device Y and differential gear D are disposed sequentially from the center toward the rear of a lower portion of the housing M. Accordingly, at the center of the housing M the clutch means 11 and the speed change device Y are vertically juxtaposed. At the rear of the housing M the speed change device K and the differential gear D are vertically juxtaposed. Thus, in accordance with the invention, the entire transmission can be compactly built in the housing M.

Figure 9:
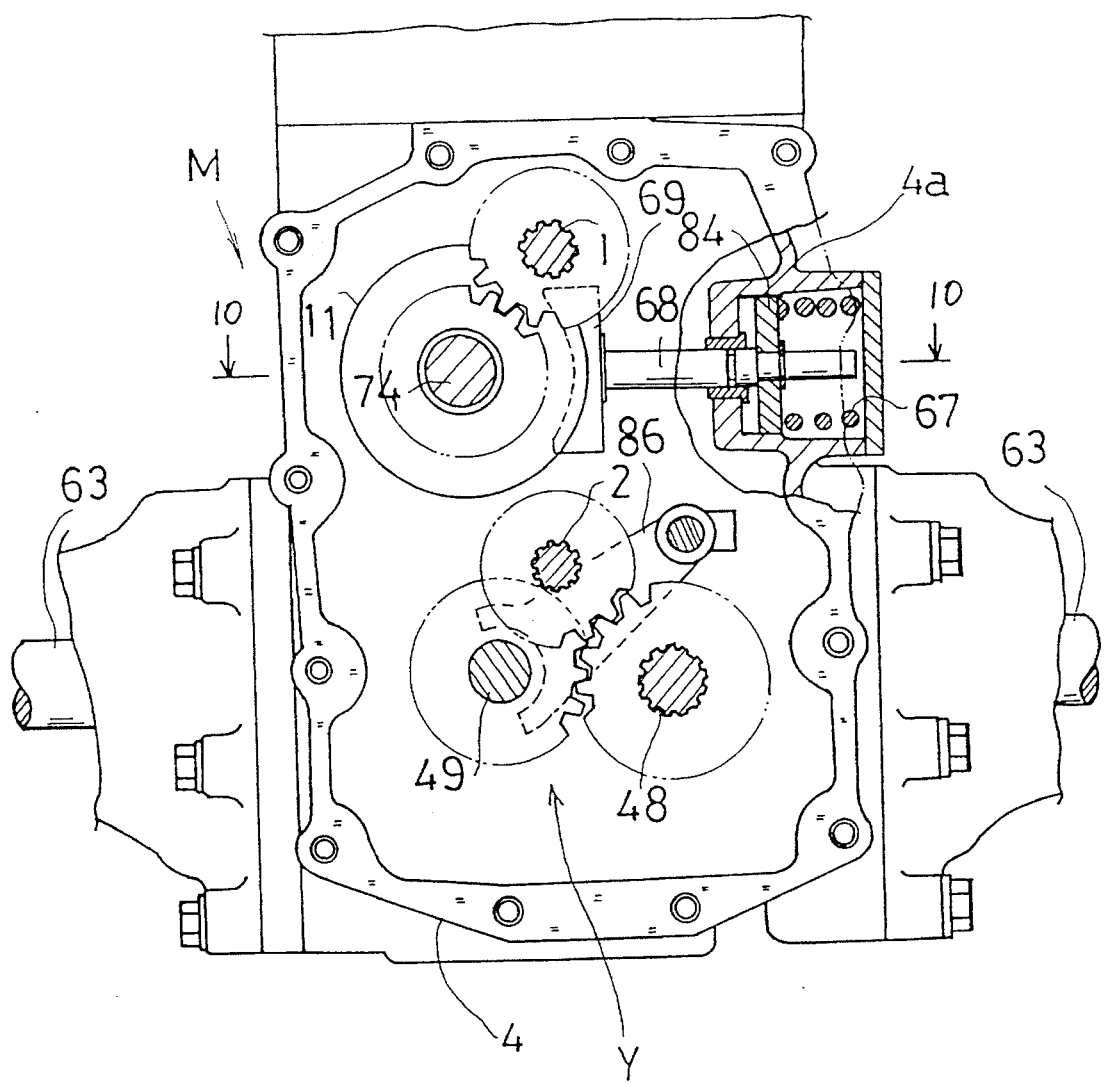
FIG. 9 is a sectional view looking in the direction of the arrows 9—9 in FIG. 3.

As seen from FIGS. 4 and 9, the first transmission shaft 48 is disposed apart from, for example, laterally shifted and under the output shaft 2. The first transmission shaft 48 and second transmission shaft 49 are laterally juxtaposed with respect to a direction of movement, whereby the height of housing M can be reduced.

The first transmission shaft 48 can be positioned with respect to the output shafts in the housing M, so that the hydraulic motor $M_o$ and speed change device Y can be positioned to minimize the height of the housing M.

A main portion of the housing M comprises coupling the front portion 5 with the rear portion 4. The front portion 5 includes the hydraulic pump P and hydraulic motor $M_o$. The rear portion 4 of housing M includes: the clutch means 11 and the speed change device K of the power takeout transmission mechanism; and the speed change device Y and differential gear D of the driving transmission device.

The front portion 5 of housing M includes a partition X, preferably, formed integrally. The portion X is formed on a rear end of front portion 5. A front end opening of front portion 5 is closed by the center section 3 and a rear end opening of front portion g is closed by the rear portion 4 of the housing.

The rear portion 4 of the housing M includes partitions 4a and 4b at central and rear portions of the housing M. A front end, rear end and upper end between the partitions 4a and 4b are open for molding convenience. The upper end opening is closed by a lower surface of the casing for the hydraulic lift device 46. The rear end opening is closed by a lid 100. In addition, a control valve 98 is attached to the lower surface of the casing of hydraulic lift device 46. The lift arm 45 is raised and lowered by reciprocating a hydraulic piston 47.

In a chamber Z between the partition X and the center section 3, the hydraulic pump P and hydraulic motor $M_o$ are vertically juxtaposed. In a chamber between the partition X and the partition 4a the clutch means 11 and the speed change device Y are vertically juxtaposed. In a chamber between the partitions 4a and 4b the speed change device K and the differential gear D are vertically juxtaposed. The gears 26 and 27 are disposed between the partition 4b and the lid 100.

In accordance with the invention, since the hydraulic stepless speed change device H is disposed in the front portion 5 of the housing, it can be independently assembled in a position separate from the transmission. Accordingly, the hydraulic stepless speed change device H can be adjusted and monitored to maintain a high quality state.

The front end of the output shaft 2 projects from the center section 3 to be connected with the input shaft 72 in a front axle casing T through a universal joint 38. A fixed gear 35 on the input shaft 72 is slidably engageable with a clutch gear 36 on a pinion shaft 71 for driving the front wheels 54. When the clutch gear 36 disengages from the fixed gear 35, the front wheels 54 are stopped from being driven. The engagement is controlled by a front wheel drive switching lever 18. When the clutch gear 36 is disposed in a route of power transmission through the universal joint 38 into the front axle casing T to the front wheels 54, a length of the output shaft 2 is minimized, which avoids having to increase the strength of bearings for the output shaft 2. Also, the length of the transmission can be limited to provide more space at a center of the working vehicle for positioning a device, for example, a mower device W.

When the speed change device Y is changed to a high speed, the clutch gear 36 in the front axle casing T disengages from the fixed gear 35, cutting off a drive force to front wheel 54. An interlocking arm 85 is associated with the speed change lever 17 as discussed in greater detail below. A pinion is fixed to a front end of the pinion shaft 71 and engages with a ring gear on a front differential gear N.

Through a damper at a front end of a crank shaft of the engine E, power from a universal joint 39 is input into a front PTO casing R from an input shaft 77. A fixed gear 40 on the input shaft 77 engages with a gear 42 on a countershaft 70 through a gear 41 on a second countershaft 76. The gear 42 is freely fitted onto the countershaft 70. A multi-disc clutch means 14 for enabling the gear 42 to be fixed to the countershaft 70 is provided so that the rotation of countershaft 70 is transmitted to a gear 44 at a front PTO shaft 16 through a gear 43, thereby driving a front PTO shaft 16.

The countershaft 70 rearwardly extends into the front axial casing T so that a gear 33 is fixed to a portion of the countershaft 70 and is positioned in a rear of the front axle casing T. The gear 33 engages with a gear 34 on a mid PTO shaft 13, so that the power of mid PTO shaft 13 is switched on and off by the multi-disc clutch means 14. The countershaft 70 is rotatably connected to the body of the working vehicle by center pin bearings 78. The front axle casing T and the countershaft 70 are rotatable relative to each other.

As shown in FIG. 3, the front portion 5 of housing M provides a casing for the hydraulic stepless speed change device H. A mounting flange 5b surrounds the front opening of the front portion 5 of housing M and the center section 3 is mounted on the mounting flange 5b, thereby closing the front end opening.

At an inside surface of the center section 3 a cylinder block 50 of the hydraulic pump P and a cylinder block 52 of the hydraulic motor $M_o$ are rotatably and slidably disposed in a vertically juxtaposed relationship. The charge pump G is disposed on an outside surface of the center section 3.

Figure 5:
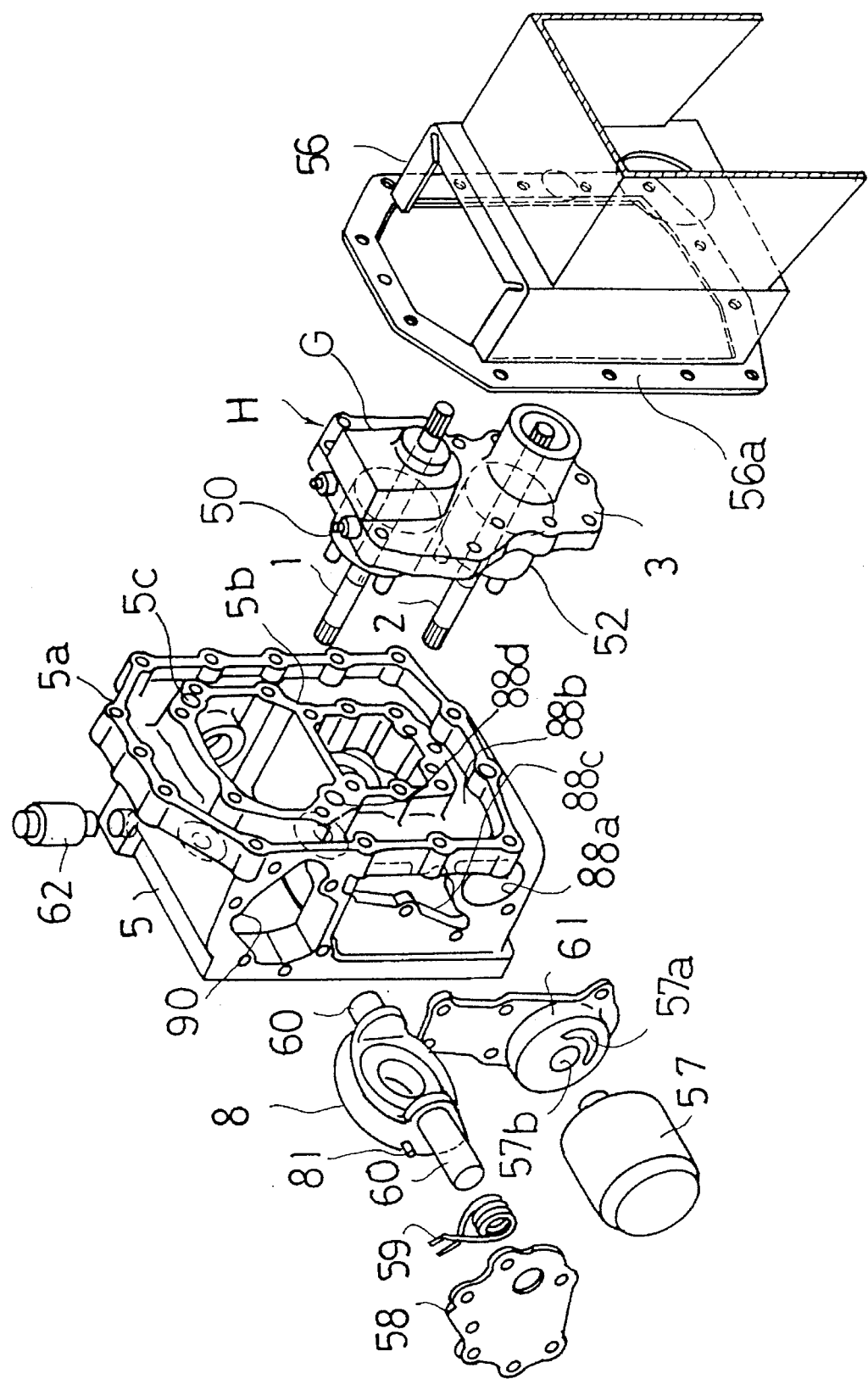
FIG. 5 is a perspective view of a hydraulic stepless speed change device in a front part of the housing.
Figure 6:
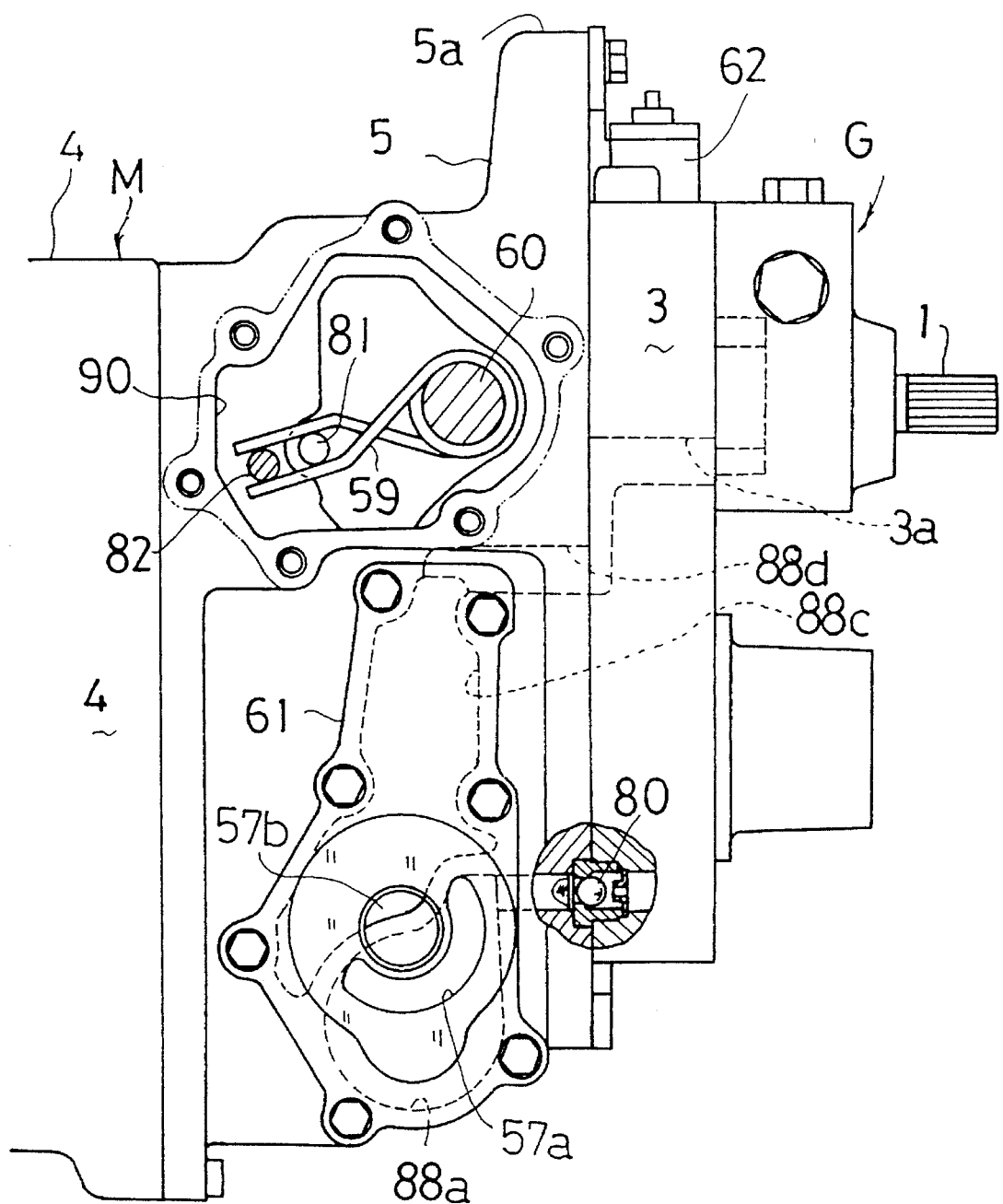
FIG. 6 is a side view of the front part of the housing and a center section.

The cylinder blocks 50 and 52 contain a plurality of axial pistons 51 and 53, which are reciprocally movable. A head of each piston 51 abuts a surface of a movable swash plate 8. A head of piston 53 abuts a fixed swash plate 9. Within the center section 3 is a closed circuit (not shown) for circulating oil between the discharge ports and suction ports of the hydraulic pump P and the hydraulic motor $M_o$. The fixed swash plate 9 is positioned against the partition X of the front portion 5 of housing. The input shaft 1 and output shaft 2 are rotatably supported and extend between the partition X and the center section 3. Rear ends of the shafts 1 and 2 project from the partition X into the rear portion 4 of housing M. The movable swash plate 8, as seen in FIGS. 5 and 6, is disposed in the portion 5 of housing M through an opening 90 formed in one of the side walls of the front portion 5 of housing M. The opening 90 is closed by a lid 58. The movable swash plate 8 is slantingly movably supported by trunnion shafts 60 between the lid 58 and another side wall of the front portion 5 of the housing M. Accordingly, assembly of the movable swash plate 8 is easy.

As shown in FIG. 6, a retaining pin 81 projects from a side surface of the movable swash plate 8. A neutral position pin 82 projects from an inside surface of the lid 58. A coiled torsion spring 59 is wound on a trunnion shaft 60 positioned at a side of the retaining pin 81. The coiled torsion spring 59 has two straight ends. The straight ends cross each other as they extend toward the retaining pin 11. Each straight end extends on the side of the retaining pin 81 different from a side the other extends on, such that the retaining pin 81 and neutral position pin 82 are sandwiched between both the straight ends. In accordance with the invention, the coiled torsion spring 59 is protected from foreign matter, such as dust or rust, at the exterior of the housing M. In addition, the torsion spring 59 applies a biasing force for biasing the movable swash plate 8 to a neutral position. In addition, an operating arm 60a (see FIG. 7) is for slantingly moving the movable swash plate 8.

Figure 7:
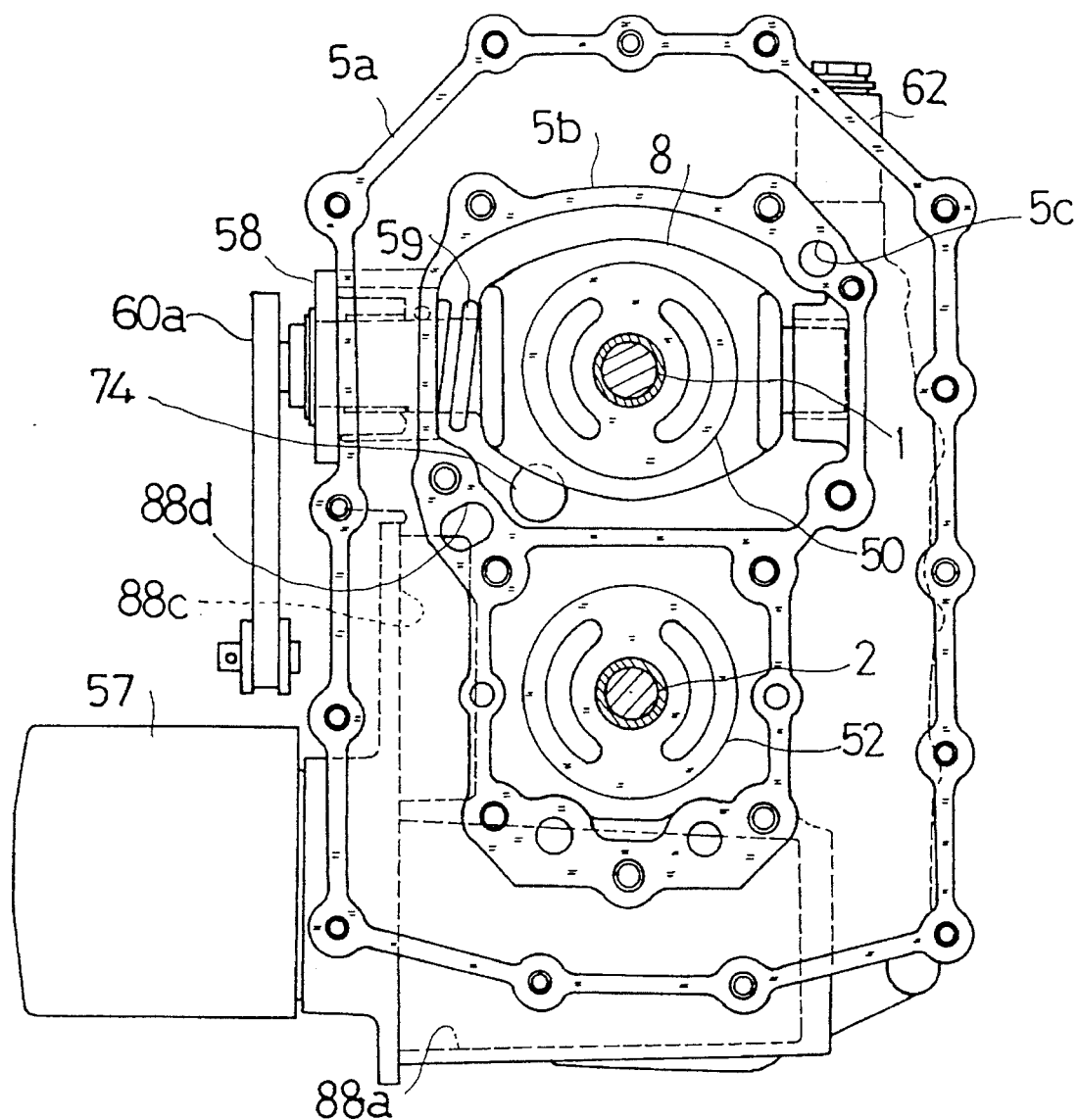
FIG. 7 is a view looking in the direction of the arrows 7—7 in FIG. 3.
Figure 8:
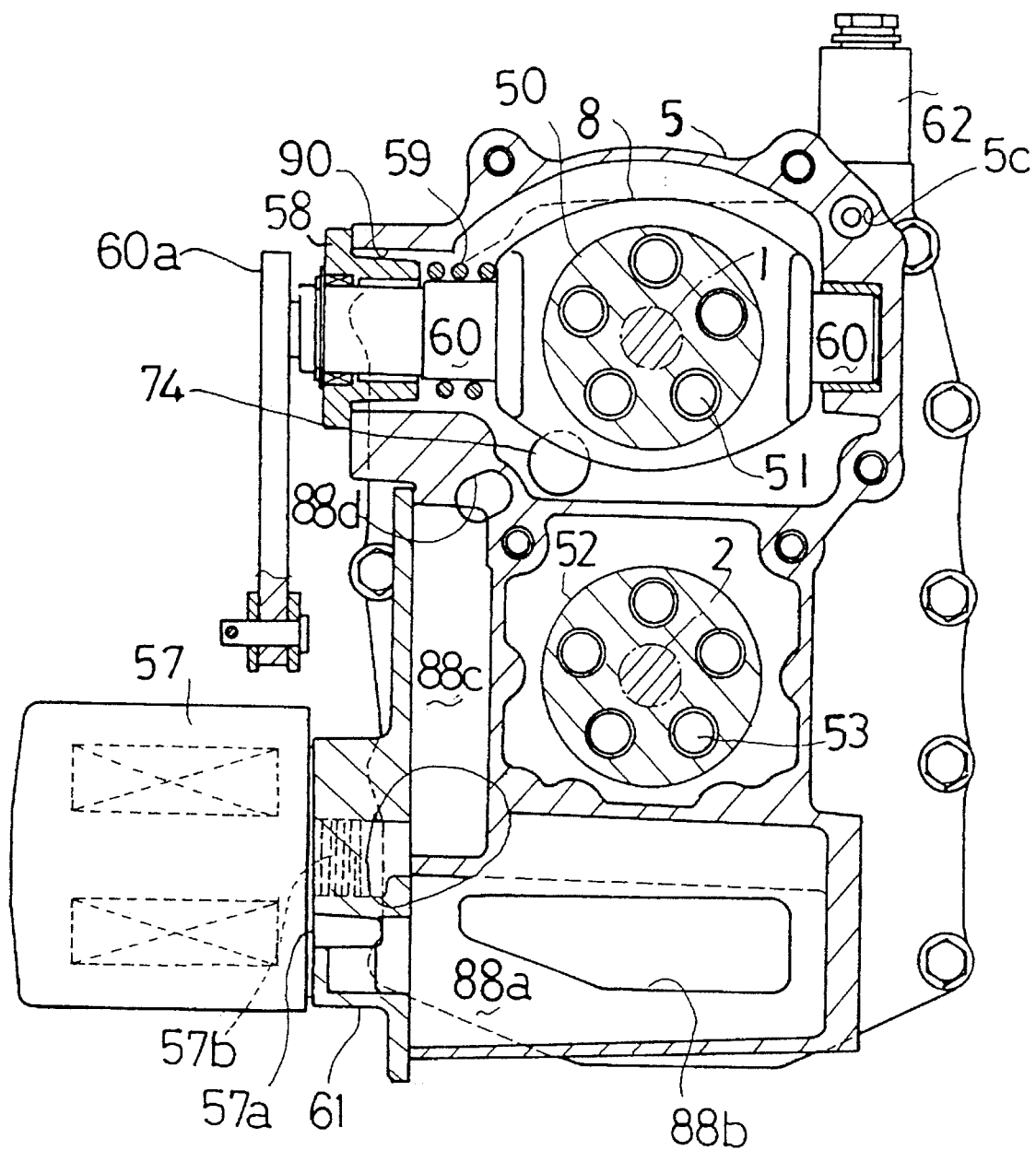
FIG. 8 is a sectional view looking in the direction of the arrows 8—8 in FIG. 3.

At the front end of the front portion 5 of housing, as discussed above, is a mounting flange 5b for mounting the center section 3. At an outer periphery of the mounting portion 5b, as seen from FIG. 7, is provided a mounting flange 5a surrounding the mounting portion 5b. The mounting flange 5a is for mounting a body flange 56 integrally formed with the front portion 5 of housing. Accordingly, the mounting flange 5a has a greater circumference than the mounting flange 5b. In addition, to facilitate manufacture of the front portion 5 of housing, it is preferable to position both the mounting flanges 5a and 5b in the same plane.

At a rear of the body frame 56 is a substantially ring shaped mounting flange 56a of a size corresponding to the mounting flange 5a. Both the mounting flanges 56a and 5a abut against each other and are connected to each other, for example, by bolts.

The bending stress acting on the body frame 56 can be absorbed by the mounting flange 5a. The mounting flange 5a is formed, preferably, integrally with the front portion 5 of housing M and has a wide area and high rigidity. The mounting flange 5b and the center section 3 can be made at least large enough to satisfy minimum requirements. Also, the bending stress from the body frame 56 substantially acts primarily on the mounting flange 5a, but not on the center section 3. Thus, there is no need to increase the strength of the center section 3.

A hollow 88a is provided inside a bottom portion of the front portion 5 of housing M so that oil relatively less foamy and collected in the bottom of the rear portion 4 of housing M flows into the hollow 88a through an opening 88b, which is below the partition X. The hollow 88a is open at a side wall of the front portion 5 of housing M, and at the side wall is mounted an oil passage plate 61 for covering the opening. On an outside of the oil passage plate 61 is detachably provided an oil filter 57 for the charge pump G. The hollow 88a connects with a suction port 57a of the oil filter 57 through the oil passage plate 61. Therefore, the hollow 88a and opening 88b function as an oil passage for fluidly connecting the suction port 57a with an oil sump at the rear portion 4 of housing M.

The discharge port 57b of the oil filter 57 connects through the oil passage plate 61 with an oil passage 88c disposed on a contact surface of the oil passage plate 61 in connection with a contact surface of the side wall on the front portion 5. The oil passage 88c is bored in the side wall of the front portion 5 to connect with an oil passage 88d open at an end surface of the mounting flange 5b. The oil passage 88d communicates with the suction port of the charge pump G through an oil passage 3a within the center section 3. Pressurized oil discharged from the charge pump G opens a check valve (not shown) disposed in the center section 3 and is supplied to the closed circuit. In addition, a check valve 80 different from the check valve discussed above. The check valve 80 is open when oil supplied from the charge pump G is insufficient so as to directly supply oil to the closed circuit.

Thus, the discharge port 57b of the oil filter 57 communicates with the suction port of the charge pump G through a wall of the front portion 5 of housing M. The suction port 57a of the oil filter 57 connects with the rear portion 4, for example, a bottom of the rear portion 4 of housing M through the opening 88a at the partition X of the front portion 5 of housing M. Accordingly, the function of supplying the oil to the hydraulic stepless speed change device H can be concentrated in the front portion 5 of housing.

The clutch means 11 comprises a hydraulic system multi-disc clutch, which has a plurality of friction plates alternately disposed and axially slidably supported between a groove at a clutch housing fixed onto the first transmission shaft 74 and splines formed at a side surface of the rotatable gear 21. In the clutch housing is a piston biased in a retracted position by a return spring. Pressurized oil is supplied to an oil chamber behind the piston, whereby the piston moves forward to bias the friction plates so as to engage the clutch.

A directional control valve 62 for selectively supplying the pressurized oil to the oil chamber is disposed in an electromagnetic valve system and disposed on the upper surface of the front portion 5 of housing M. The directional control valve 62 is manually switched by a switch SW provided, for example, on an instrument panel near a driver's seat to engage or disengage the clutch means 11. An oil intake port 62a (in FIG. 11) is in communication with the directional control valve 62. Discharge oil discharged from the charge pump G and divided in the center section 3 is adapted to be supplied to the intake port 62a through an oil passage 5c (refer to FIG. 10) bored in the upper wall of the front portion 5 of housing M.

Figure 10:
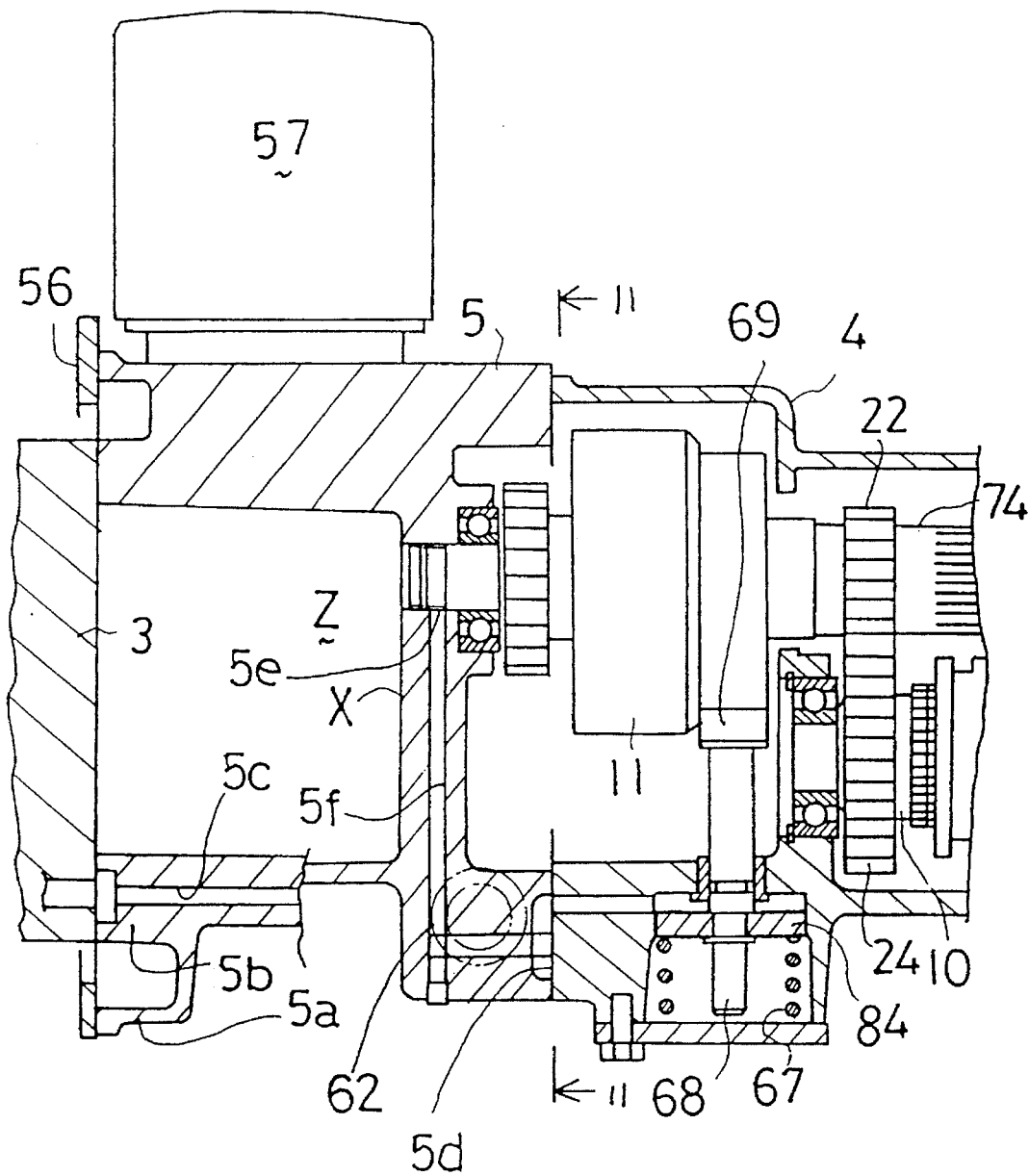
FIG. 10 is a sectional view looking in the direction of the arrows 10—10 in FIG. 9.
Figure 11:
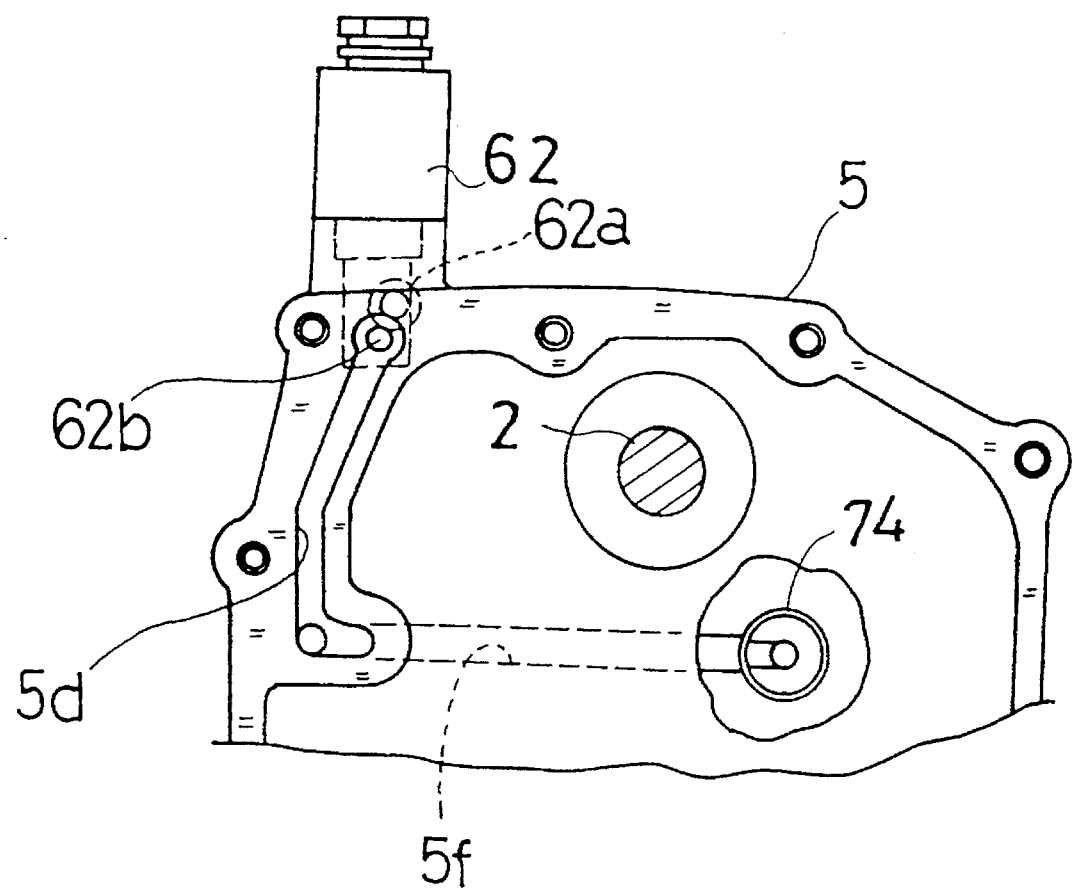
FIG. 11 is a sectional view looking in the direction of the arrows 11—11 in FIG. 10.

Also, as shown in FIG. 10, an end, for example, a front end of the first transmission shaft 74 is inserted into a hollow cylindrical portion provided in the partition X of the front portion 5 of housing M. An oil relay 5e is formed between an annular groove provided at an outer periphery of the front end of the first transmission shaft 74 and the inner periphery of the hollow cylindrical portion. The annular groove communicates with the oil chamber behind the piston and an oil passage 5f bored in the partition X communicates with the oil relay 5e. An oil discharge port 62b in the directional control valve 62 communicates with the oil passage 5f through an oil passage 5d disposed at the contact surface between the front portion 5 and the rear portion 4.

In addition, an axial end surface of the first transmission shaft 74 is disposed in or faces an interior of a chamber Z, which is filled with the oil for the hydraulic stepless speed change device H. An oil passage for oil to lubricate and cool the friction plates of the clutch means 11 is open at an extreme end surface of the first transmission shaft 74. The oil in chamber Z is utilized for lubricating and cooling the friction plates.

As shown in FIGS. 9 and 10, in the rear portion 4 of housing M is an inertia rotary braking member 69, which can fix the housing of the clutch means 11. The inertia rotary braking member 69 is positioned on a lateral side of the clutch means 11 and is mounted on an extreme end of a connecting rod 68. The connecting rod 68 is contained in a side wall of the rear portion 4 and engages with a piston 84 forwardly biased by a braking spring 67. An oil chamber 120 is provided behind the piston 84 and communicates with the oil passage 5d. Thus, when the clutch means 11 disengages, the pressurized oil is discharged from the oil chamber 120. Accordingly, the braking spring 67 pushes the piston 84 and the inertia rotary braking member 69 abuts against the outer periphery of the housing of the clutch means 11 to brake the first transmission shaft 74, thus the rear PTO shaft 12. When the clutch means 11 engages, the pressure oil is discharged to the oil chamber 120 so as to push the piston 84 against the braking spring 67. Accordingly, the inertia rotary braking member 69 disengages from the housing of clutch means 11.

In FIG. 12, the differential gear D and the rear axle 64 are disposed in the rear portion 4 of housing M. The rotation from the differential gear D is transmitted to the differential yoke shaft 63. A disc brake 66 for braking rear wheels 55 is mounted on the differential yoke shaft 63. A brake lever shaft 65 operates the disc brake 66. Above the differential gear D are laterally juxtaposed the first transmission shaft 74 and second transmission shaft 10, which are included in the speed change device K of the power takeout transmission mechanism. In addition, a shift form 89a sliding a speed change sliding member 89 on the second transmission shaft 10 is disposed on a shift form shaft 99 bridging across partitions 4a and 4b of the rear portion 4. A speed change arm 91 is moved longitudinally in a swinging motion by a PTO speed change lever (not shown) disposed in the vicinity of the driver's seat. The speed change arm 91 allows the shift form 89a to slide on the shift form shaft 99.

Figure 13:
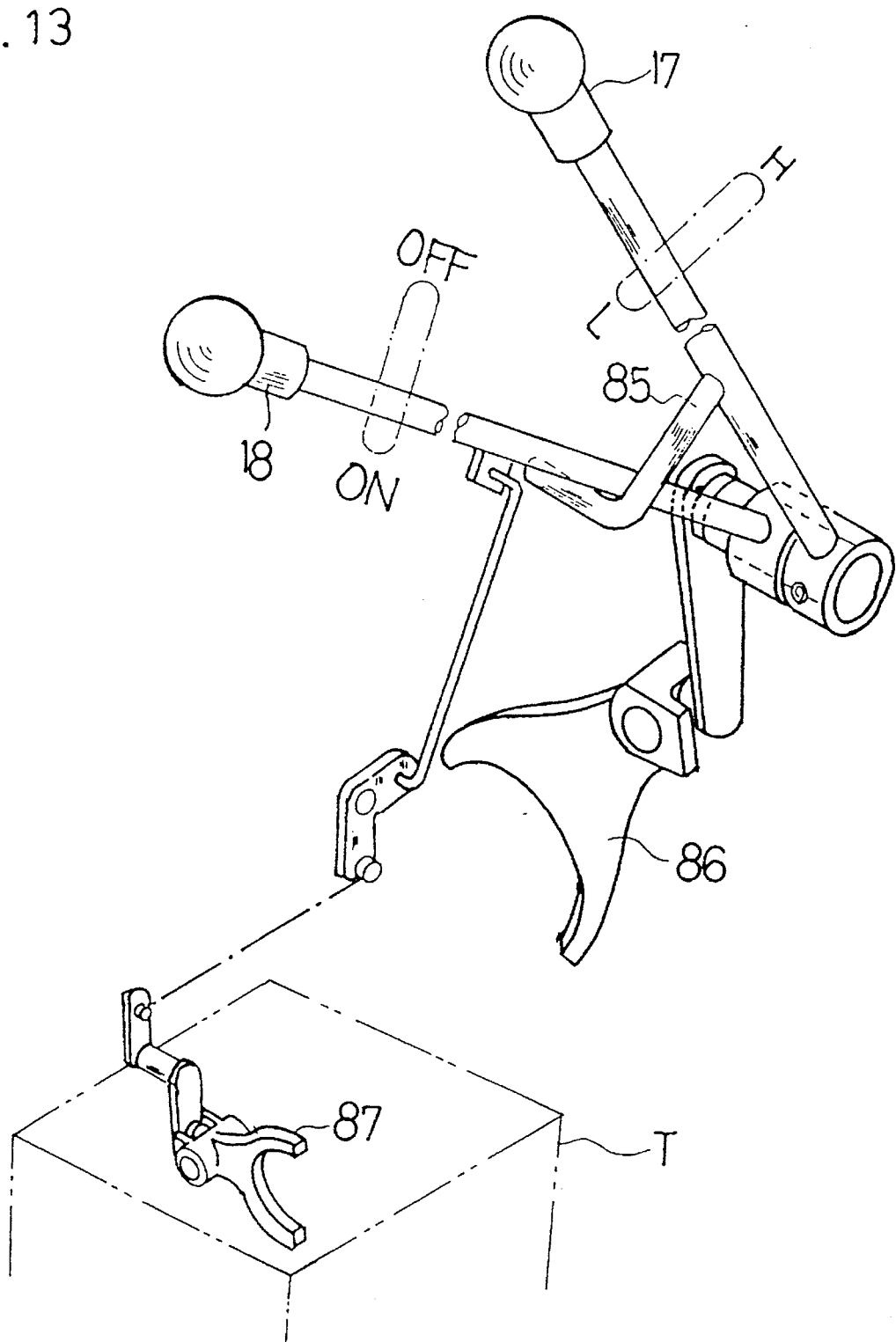
FIG. 13 is a perspective view showing an interlocking mechanism of a front wheel drive switching lever and a speed change lever.

FIG. 13 is a perspective view of an interlocking mechanism of the speed change lever 17 and front wheel drive switching lever 18. An L-shaped interlock arm 85 projects from the speed change lever 17. The interlock arm 85 is capable of abutting against a lower surface of the front wheel drive switching lever 18. A rotary base of the front wheel drive switching lever 18 is freely fitted into a support spindle for the speed change lever 17. The front wheel drive switching lever 18 is connected through a wire or the like to a clutch fork 87 for longitudinally sliding the slidable clutch gear 36 in the front axle casing T, so as to controllably operate driving of the wheels. For example, when the front wheel drive switching lever 18 is in an ON position the front wheels are driven, and when it is in an OFF position the front wheels are stopped from being driven.

The speed change lever 17 interlocks with a speed change shift fork 86 for reciprocally moving the speed change gear.

32 of the driving transmission mechanism Y for selecting different speeds. For example, an L position can be selected where the speed change device Y is in low speed, or a H position can be selected where the speed change device Y is in high speed. When the speed change lever 17 is in the L position, the front wheel drive switching lever 18 can optionally be in the ON position or OFF position. When the front wheel drive switching lever 18 is in the ON position and the speed change lever 17 is switched to the H position, the interlock arm 85 forcibly switches the front wheel drive switching lever 18 into the OFF position. When the speed change lever 17 is in the H position, the front wheel drive switching lever 18 is regulated by the interlock arm 85 so as not to switch into the ON position.

Thus, when the vehicle is in use, for example, on the road, if the vehicle speed changes to high speed, the front wheels 54 are automatically stopped from being driven. Accordingly, when the vehicle is in high speed, the front wheels 54 rotate at the same speed as the rear wheels 55. This avoids dragging and unevenly wearing the front wheels. Also, when more traction is required, the speed change device Y can be switched to low speed so that the front wheels 54 can be optionally driven to increase traction.

While a preferred embodiment of the invention has been described using specific terms, such description is for illustrative purpose only, and it is to be understood that changes and variations may be made without departing from the spirit or scope of the following claims.

What is claimed is:

1. A transmission for a working vehicle, comprising:
   a housing;
   a hydraulic stepless speed change device disposed in said housing having an input shaft and an output shaft;
   a power takeout transmission mechanism disposed in said housing for connecting said input shaft of said hydraulic stepless speed change device with a power takeout shaft of said power takeout transmission mechanism, said power takeout transmission comprising a clutch means for intermittently rotating said power takeout shaft and a first speed change device for controlling power to the power takeout shaft; and
   a driving transmission mechanism disposed in said housing for connecting said output shaft of said hydraulic stepless speed change device with a pair of axles disposed in said housing, said driving transmission mechanism comprising a second speed change device for controlling a speed of said pair of axles and a differential gear for differentially coupling said pair of axles to each other,
   wherein said input shaft and said output shaft are vertically juxtaposed in a first portion of said housing, said first speed change device and said differential gear are vertically juxtaposed in a second portion of the housing, and said clutch means and said second speed change device are vertically juxtaposed in a third portion of the housing between said first and second portions.

2. A transmission for a working vehicle according to claim 1, wherein said power takeout transmission mechanism further comprises:
   a first transmission shaft connecting with said input shaft, wherein said first transmission shaft is offset from said input shaft; and
   a second transmission shaft extending in parallel to said first transmission shaft and connecting with said power takeout shaft, said clutch means of said power takeout transmission mechanism being disposed on a first half of said first transmission shaft and said first speed change device of said power takeout transmission mechanism being disposed between a second half of said first transmission shaft and Said second transmission shaft.

3. A transmission for a working vehicle according to claim 2, wherein said first transmission shaft is disposed laterally under said input shaft in said housing.

4. A transmission for a working vehicle according to claim 3, wherein said first transmission shaft and second transmission shaft are laterally juxtaposed in said housing.

5. A transmission for a working vehicle according to claim 1, wherein said driving transmission mechanism further comprises:
   a first transmission shaft connecting with said output shaft, wherein said first transmission shaft is offset from said output shaft; and
   a second transmission shaft extending in parallel to said first transmission shaft and connecting with said differential gear, said second speed change device of said driving transmission mechanism being disposed between said first transmission shaft and said second transmission shaft.

6. A transmission for a working vehicle according to claim 5, wherein said first transmission shaft is disposed laterally under said output shaft in said housing.

7. A transmission for a working vehicle according to claim 6, wherein said first transmission shaft and second transmission shaft are laterally juxtaposed in said housing.

8. A transmission for a working vehicle according to claim 1, wherein the first portion of the housing is in a front of the housing.

9. A transmission for a working vehicle according to claim 1, wherein the second portion of the housing in a rear of the housing.

10. A transmission for a working vehicle according to claim 1, wherein the third portion of the housing is in a center of the housing.

11. A transmission for a working vehicle, comprising:
    a housing having a front end opening, a first mounting flange surrounding said front end opening, and a second mounting flange surrounding said first mounting flange, wherein said second mounting flange is for mounting to a body frame;
    a center section mounted on said first mounting flange, wherein said center section closes said front end opening;
    a hydraulic stepless speed change device disposed in said housing, said hydraulic stepless speed change device comprising,
    a hydraulic pump mounted on said center section,
    a hydraulic motor mounted on said center section,
    an input shaft for driving said hydraulic pump, and
    an output shaft driven by said hydraulic motor,
    wherein said center section includes a closed circuit for fluidly connecting said hydraulic pump and said hydraulic motor;
    a power takeout shaft disposed in said housing;
    a power takeout transmission mechanism disposed in said housing for drivingly connecting said input shaft and said power takeout shaft;
    a pair of axles disposed in said housing; and
    a driving transmission mechanism disposed in said housing for drivingly connecting said output shaft and said pair of axles.

12. A transmission for a working vehicle according to claim 11, wherein said body frame includes a substantially ring shaped mounting flange formed at a rear of said body frame, said mounting flange of said body frame having a size corresponding to a size of said second mounting flange.

13. A transmission for a working vehicle according to claim 11, wherein said housing includes a first portion separably coupled to a second portion axially of the vehicle, said front end opening, said mounting flange and said second mounting flange being formed on a front end of said first portion, said hydraulic pump being mounted on an inside surface of said center section such that said hydraulic pump is disposed within said first portion, and whereby said first portion is formed as at least an integral part of said hydraulic pump, and said power takeout shaft, said power takeout transmission mechanism, said pair of axles and said driving transmission mechanism being disposed within said second portion.

14. A transmission for a working vehicle according to claim 13, further comprising:

a charge pump mounted on an outside surface of said center section and driven by said input shaft, wherein said charge pump supplies operating oil to said closed circuit of said center section.

15. A transmission for a working vehicle according to claim 13, wherein said hydraulic motor is mounted on said inside surface of said center section such that said hydraulic motor is disposed within said first portion of said housing, said hydraulic pump and said hydraulic motor being vertically juxtaposed within said first portion of said housing, whereby said first portion is formed as an integral part of said hydraulic stepless speed change device.

16. A transmission for a working vehicle according to claim 13, wherein said first portion of said housing includes a first partition formed on a rear end of said first portion, said second portion of said housing including an open front end and a second partition at a central portion of said second portion of said housing, wherein said first portion of said housing is separably coupled to said open front end of said second portion, thereby closing said open front end of said second portion, said driving transmission mechanism including a speed change device and a differential gear for differentially coupling said pair of axles, and said speed change device of said driving transmission mechanism being disposed between said first partition of said first portion of said housing and said second partition of said second portion of said housing.

17. A transmission for a working vehicle according to claim 16, wherein said power takeout transmission mechanism includes a clutch means for controlling power from said input shaft to said power takeout shaft, and said clutch means of said power takeout transmission mechanism and said speed change device of said driving transmission mechanism being vertically juxtaposed within said second portion of said housing.

18. A transmission for a working vehicle according to claim 13, wherein said first portion of said housing has an opening in a wall of said housing and a lid, and said hydraulic pump is a variable displacement hydraulic pump having a movable swash plate disposed in said housing through said opening and rotatably supported between another wall of said housing and said lid.

19. A transmission for a working vehicle according to claim 18, further comprising:

a spring mechanism for biasing said movable swash plate to a neutral position, said spring mechanism being disposed in said first portion of said housing.

20. A transmission for a working vehicle according to claim 11, wherein surfaces of said first and second mounting flanges lie in the same plane.

21. A transmission for a working vehicle, comprising:

a housing including a first portion having a front end opening, a second portion and a partition disposed between said first and second portions, wherein said partition has a cylindrical hollow portion;

a center section mounted on said first portion of said housing to close said front end opening;

a hydraulic stepless speed change device disposed in said housing including,
a hydraulic pump mounted on said center section,
a hydraulic motor mounted on said center section,
an input shaft for driving said hydraulic pump, and
an output shaft driven by said hydraulic motor, wherein said center section includes a closed fluid circuit for fluidly connecting said hydraulic pump and said hydraulic motor;

a charge pump disposed on said first portion of said housing driven by said input shaft;

a power takeout shaft disposed in said second portion of said housing;

a power takeout transmission mechanism disposed in said second portion of said housing for driving said power takeout shaft, said power takeout transmission mechanism including,
(a) a hydraulic clutch means for intermittently rotating said power takeout shaft,
(b) a transmission shaft disposed between said input shaft and said power takeout shaft, and disposed in parallel with said input shaft, wherein a front end of said transmission shaft is inserted into said cylindrical hollow portion provided in said partition and said clutch means is disposed on said transmission shaft,
(c) a directional control valve means for selectively operating said clutch means, wherein said directional control valve means receives oil discharged from said charge pump,
(d) an oil relay means for supplying oil discharged from said directional control valve means to said clutch means, wherein said oil relay means is formed between said front end of said transmission shaft and said cylindrical hollow portion provided in said partition;

a pair of axles disposed in said second portion of said housing; and a driving transmission mechanism disposed substantially in said second portion of said housing for drivingly connecting said output shaft and said pair of axles.

22. A transmission for a working vehicle according to claim 21, wherein said first portion of said housing is separably coupled to said second portion of said housing axially of the vehicle, said first portion having a front end and a rear end, wherein said front end opening is on said front end and said partition is on said rear end, and said hydraulic pump being mounted on an inside surface of said center section, wherein said hydraulic pump is disposed in said first portion of said housing, and whereby said first portion is formed as at least an integral part of said hydraulic pump.

23. A transmission for a working vehicle according to claim 22, wherein said hydraulic motor is mounted on said inside surface of said center section and is disposed in said first portion of said housing, said hydraulic pump and said hydraulic motor being vertically juxtaposed in said first portion of said housing, and whereby said first portion is formed as an integral part of said hydraulic stepless speed change device.

24. A transmission for a working vehicle according to claim 22, wherein said first portion of said housing has an opening in a wall of said housing and a lid for closing said opening, and said hydraulic pump is a variable displacement hydraulic pump having a movable swash plate being disposed in said housing through said opening and being rotatably supported between another wall of said first portion of said housing and said lid.

25. A transmission for a working vehicle according to claim 24, further comprising:

a spring mechanism for biasing said movable swash plate to a neutral position, said spring mechanism being disposed in said first portion of said housing.

26. A transmission for a working vehicle according to claim 21, further comprising:

a braking means for braking said transmission shaft when said clutch means is disengaged and for releasing a braking action to said transmission shaft when said clutch means is operated.

27. A transmission for a working vehicle according to claim 26, wherein said braking means is a spring-operated and hydraulic-released type and said clutch means is a hydraulic-operated and spring-released type, and said directional control valve means selectively supplies the oil discharged from said charge pump to said clutch means and said braking means.

28. A transmission for a working vehicle according to claim 21, wherein said charge pump is disposed on said center section, and a portion of the oil discharged from said charge pump being supplied to said closed circuit in said center section.

29. A transmission for a working vehicle according to claim 22, wherein said second portion of said housing includes an open front end and a second partition formed at approximately a central portion of said second portion of said housing, said first portion being separably coupled to said open front end of said second portion, thereby closing said open front end, said driving transmission mechanism including a speed change device and a differential gear for differentially coupling said pair of axles, and said clutch means and said speed change device being disposed between said first partition and said second partition.

30. A transmission for a working vehicle, comprising:

a housing including a first portion having a front opening and a second portion separably coupled to said first portion axially of the vehicle;

a center section mounted on said first portion to close said front opening;

a hydraulic stepless speed change device disposed in said housing, comprising, a hydraulic pump mounted on said center section, a hydraulic motor mounted on said center section, an input shaft for driving said hydraulic pump, and an output shaft driven by said hydraulic motor, wherein said center section includes a closed circuit for fluidly connecting said hydraulic pump and said hydraulic motor, and said hydraulic pump is disposed in said first portion, whereby said first portion is formed as at least an integral part of said hydraulic pump;

a charge pump driven by said input shaft disposed in said first portion of said housing for supplying oil to said closed circuit of said center section, said charge pump having a charge pump suction port and a charge pump discharge port;

an oil filter disposed on said first portion of said housing, said oil filter including an oil filter suction port and an oil filter discharge port;

an oil sump formed in said second portion of said housing;

an oil passage means for fluidly connecting said oil filter suction port with said oil sump, and for fluidly connecting said oil filter discharge port with said charge pump suction port and said charge pump discharge port with said closed circuit of said center section, wherein said oil passage means is disposed in said first portion of said housing;

a power takeout shaft disposed in said second portion of said housing;

a power takeout transmission mechanism disposed in said second portion of said housing for drivingly connecting said input shaft and said power takeout shaft;

a pair of axles disposed in said second portion of said housing; and a driving transmission mechanism disposed in said second portion of said housing for drivingly connecting said output shaft and said pair of axles.

31. A transmission for a working vehicle according to claim 30, wherein said charge pump is mounted on an outside surface of said center section.

32. A transmission for a working vehicle according to claim 30, wherein said hydraulic motor is mounted on said center section such that said hydraulic motor is disposed within said first portion of said housing, said hydraulic pump and said hydraulic motor being vertically juxtaposed in said first portion of said housing, and whereby said first portion is formed as an integral part of said hydraulic stepless speed change device.

33. A transmission for a working vehicle according to claim 30, wherein said first portion of said housing has an opening in a wall of said housing and a lid for closing said opening, and said hydraulic pump is a variable displacement hydraulic pump having a movable swash plate being disposed in said housing through said opening and being rotatably supported between another wall of said housing and said lid.

34. A transmission for a working vehicle according to claim 33, further comprising:

a spring mechanism for biasing said movable swash plate to a neutral position, said spring mechanism being disposed within said first portion of said housing.

35. A transmission for a working vehicle according to claim 30, wherein said oil filter is detachably mounted on an outer wall of said first portion of said housing.

36. A transmission for a working vehicle according to claim 30, wherein said first portion of said housing includes a first partition formed on a rear end of said first portion, said second portion of said housing including an open front end and a second partition at a central portion of said second portion of said housing, wherein said first portion of said housing is separably coupled to said open front end of said second portion, thereby closing said open front end, said driving transmission mechanism including a speed change device and a differential gear for differentially coupling said pair of axles, and said speed change device of said driving transmission mechanism being disposed between said first partition of said second portion of said housing.

37. A transmission for a working vehicle according to claim 36, wherein said power takeout transmission mechanism includes a clutch means for controlling power from said input shaft to said power takeout shaft, and said clutch means of said power takeout transmission mechanism and said speed change device of said driving transmission mechanism are vertically juxtaposed in said second portion of said housing.

38. A transmission for a working vehicle according to claim 34, wherein said first portion of said housing includes a partition formed on a rear end of said first portion, said second portion of said housing including an open front end formed on a front end of said second portion, and said oil passage means including an opening in connection with said oil sump of said second portion of said housing.

* * * * *